(12) United States Patent
Nowak et al.

(10) Patent No.: US 9,157,381 B2
(45) Date of Patent: Oct. 13, 2015

(54) MECHANICALLY CONTROLLABLE VALVE TRAIN ASSEMBLY, INTERNAL COMBUSTION ENGINE AND METHOD FOR OPERATING AN INTERNAL COMBUSTION ENGINE

(71) Applicant: KOLBENSCHMIDT PIERBURG INNOVATIONS GMBH, Neckarsulm (DE)

(72) Inventors: Martin Nowak, Leverkusen (DE); Karsten Grimm, Aachen (DE); Michael Breuer, Simmerath (DE); Stefan Moormann, Kaarst (DE); Stefan Rothgang, Rheinberg (DE)

(73) Assignee: KOLBENSCHMIDT PIERBURG INNOVATIONS GMBH, Neckarsulm (DE)

( * ) Notice: Subject to any disclaimer, the term of this patent is extended or adjusted under 35 U.S.C. 154(b) by 0 days.

(21) Appl. No.: 14/390,028

(22) PCT Filed: Jan. 17, 2013

(86) PCT No.: PCT/EP2013/050839
§ 371 (c)(1),
(2) Date: Oct. 2, 2014

(87) PCT Pub. No.: WO2013/149737
PCT Pub. Date: Oct. 10, 2013

(65) Prior Publication Data
US 2015/0047586 A1 Feb. 19, 2015

(30) Foreign Application Priority Data
Apr. 5, 2012 (DE) .......................... 10 2012 006 983

(51) Int. Cl.
*F01L 1/18* (2006.01)
*F02D 13/06* (2006.01)
*F01L 13/00* (2006.01)
*F01L 1/34* (2006.01)

(52) U.S. Cl.
CPC . *F02D 13/06* (2013.01); *F01L 1/34* (2013.01); *F01L 13/0005* (2013.01);
(Continued)

(58) Field of Classification Search
CPC .. F02D 13/06; F01L 13/0005; F01L 13/0026; F01L 2013/0068; F01L 2105/00; F01L 2800/08
USPC ................................ 123/90.39, 90.44, 90.31
See application file for complete search history.

(56) References Cited

U.S. PATENT DOCUMENTS 7,895,981 B2 *  3/2011  Bosl-Flierl et al. ........ 123/90.39
2003/0062019 A1  4/2003  Schaefer-Siebert
(Continued)

FOREIGN PATENT DOCUMENTS

DE   101 48 347 A1   4/2003
DE   103 23 665 A1   12/2004
(Continued)

*Primary Examiner* — Ching Chang
(74) *Attorney, Agent, or Firm* — Norman B. Thot

(57) ABSTRACT

A valve train assembly for an engine comprising cylinders, each comprising a gas inlet and a gas outlet valve. A camshaft comprises a peripheral contour. A valve stroke adjusting device comprises a control shaft comprising control contours. An intermediate lever arrangement comprises an intermediate lever comprising a working curve which cooperates with a swivel lever, and an engagement element connected to a control contour. Each intermediate lever is connected to the peripheral contour. A transmission arrangement provides that an intermediate lever arrangement and a swivel lever arrangement is associated with each gas inlet valve. A control contour for an idle range is similar to a control contour for a full-load range. A control contour for a part-load range of a gas inlet valve of a shut-off cylinder comprises a section different to a control contour for a part-load range of the gas inlet valve of a remaining cylinder.

9 Claims, 7 Drawing Sheets

(52) U.S. Cl.
CPC ........ *F01L 13/0021* (2013.01); *F01L 13/0026* (2013.01); *F01L 2013/0068* (2013.01); *F01L 2105/00* (2013.01); *F01L 2800/08* (2013.01); *Y02T 10/18* (2013.01)

(56) References Cited

U.S. PATENT DOCUMENTS

2007/0234983 A1 10/2007 Gibson

2010/0121554 A1 5/2010 Seils

FOREIGN PATENT DOCUMENTS

| DE | 10 2004 003 327 A1 | 9/2005 |
| DE | 10 2005 040 959 A1 | 3/2007 |
| DE | 10 2007 014 646 A1 | 10/2007 |
| DE | 10 2006 033 559 A1 | 1/2008 |
| DE | 10 2006 055 800 A1 | 5/2008 |
| DE | 10 2010 062 319 A1 | 6/2012 |
| EP | 1 760 278 A2 | 3/2007 |

* cited by examiner

MECHANICALLY CONTROLLABLE VALVE TRAIN ASSEMBLY, INTERNAL COMBUSTION ENGINE AND METHOD FOR OPERATING AN INTERNAL COMBUSTION ENGINE

CROSS REFERENCE TO PRIOR APPLICATIONS

This application is a U.S. National Phase application under 35 U.S.C. §371 of International Application No. PCT/EP2013/050839, filed on Jan. 17, 2013 and which claims benefit to German Patent Application No. 10 2012 006 983.9, filed on Apr. 5, 2012. The International Application was published in German on Oct. 10, 2013 as WO 2013/149737 A1 under PCT Article 21(2).

FIELD

The present invention relates to a mechanically-controllable valve train assembly for an internal combustion engine comprising at least two cylinders which respectively comprise at least one gas inlet valve and at least one gas outlet valve, wherein at least one transmission arrangement is provided so that at least one intermediate lever arrangement and a swivel lever arrangement is associated with each gas inlet valve, wherein an intermediate lever of the intermediate lever arrangement comprises a working curve for cooperating with a swivel lever of the swivel lever arrangement, wherein the intermediate lever is operatively connected to a peripheral contour of a camshaft, and wherein the intermediate lever arrangement comprises an engagement element which is operatively connected to a control contour of a valve stoke adjusting device so that different valve strokes can be adjusted, and a zero stroke adjustment of the gas inlet valve of at least one shut-off cylinder is possible.

The present invention further relates to an internal combustion engine comprising such a mechanically-controllable valve train assembly, and to a method for operating such an internal combustion engine.

BACKGROUND

Valve train assemblies of the above type are widely known. Their function resides in adapting the combustion process to the respective load requirements via the valve stroke height, and thus via the filling level of the cylinders of the internal combustion engine and, correspondingly, to achieve a largely efficient and thus also low-emission combustion. It is further known that, in certain load ranges; and particularly in the part-load range, a certain number of cylinders can be completely shut off, e.g., in order to run a four-cylinder internal combustion engine by operating only two cylinders. The focus here is also on efficiency and emission optimization of the combustion process. Numerous techniques are known with respect to cylinder shut-off. These include e.g., switchable key plungers, rocker arms with lost motion function, as well as push cams with zero stroke contour. These technical concepts have the problem that the respective activation and deactivation of the corresponding valves of the cylinder that is to be shut off must be performed when the corresponding valves are in the closed state, i.e., between two work cycles. The internal combustion engine will consequently experience a distinct load jump which must be dampened. The theoretical degrees of efficiency and advantages will again be partially lost in this manner.

DE 10 2006 033 559 A1 describes a mechanically controllable valve train comprising two valve stroke adjustment devices which can be driven independently from each other so that the valve stroke adjustment devices can also be used to shut off the cylinder. The provision of independently operable valve stroke adjustment devices will, however, increase expenditure for assembly and thereby costs.

SUMMARY

An aspect of the present invention is to provide a mechanically controllable valve train as well as an internal combustion engine, and a method for operating the internal combustion engine, which avoid the above-mentioned disadvantages.

In an embodiment, the present invention provides a mechanically controllable valve train assembly for an internal combustion engine comprising cylinders, at least one of which is a shut-off cylinder and at least one of which is a remaining cylinder, each of the cylinders comprising at least one gas inlet valve and at least one gas outlet valve. The mechanically controllable valve train assembly includes at least one swivel lever arrangement. Each of the at least one swivel lever arrangement comprises a swivel lever. A camshaft comprises a peripheral contour. A valve stoke adjusting device comprises a control shaft comprising control contours arranged thereon. At least one intermediate lever arrangement. Each of the at least one intermediate lever arrangement comprises an intermediate lever comprising a working curve configured to cooperate with the swivel lever, and an engagement element configured to be operatively connected to one of the control contours of the valve stoke adjusting device so that different valve strokes are adjustable and a zero stroke adjustment of the at least one gas inlet valve of the at least one shut-off cylinder is possible. Each intermediate lever is configured to be operatively connected to the peripheral contour of the camshaft. At least one transmission arrangement. Each of the at least one transmission arrangement is arranged so that one of the at least one intermediate lever arrangement and one of the at least one swivel lever arrangement is associated with each of the at least one gas inlet valve. With respect to the control contours, a control contour for an idle range is substantially identical in design to a control contour for a full-load range, and a control contour for a part-load range of the at least one gas inlet valve assigned to the shut-off cylinder comprises a section having a different design compared to a control contour for a part-load range of the at least one gas inlet valve of the remaining cylinder. It is thereby possible (e.g., in serially arranged cylinders) to perform a cylinder shut-off using only one adjustment device.

BRIEF DESCRIPTION OF THE DRAWINGS

The present invention is described in greater detail below on the basis of embodiments and of the drawings in which.

DETAILED DESCRIPTION

Figure 1:
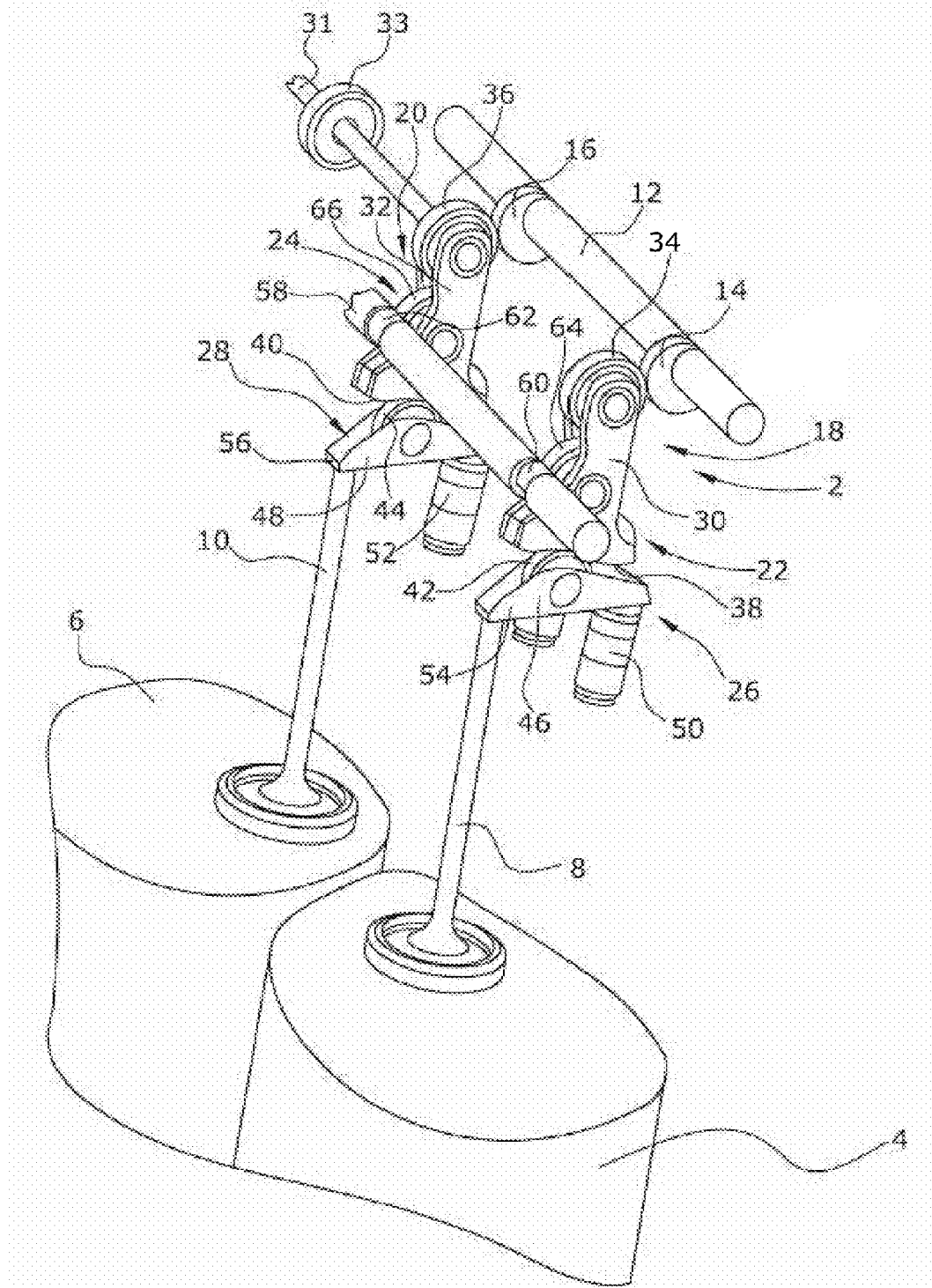
FIG. 1 shows a schematic perspective view of two adjacent gas inlet valves, each having assigned to it a mechanically-controllable valve train assembly.

In order to keep the assembly process simple and inexpensive, it is advantageous if the control contours are arranged within a basic circle of the control shaft.

It can be advantageous if the section of the control contour assigned to the shut-off cylinders is set back relative to the corresponding section of the control contour assigned to the remaining cylinders.

A compact mechanically controllable valve train assembly is created by the feature that two intermediate levers are connected to each other via a connection shaft at the end opposite to the working curve, a first roll being provided for the force transmission of the camshaft, and a second roll being provided between the intermediate levers for guidance in a sliding guide.

In order to provide a load-dependent cylinder shut-off of the internal combustion engine that can be realized without problematic and efficiency-reducing load jumps, it is advantageous if a direct ratio exists between the radius r of the respective control contour and the stroke height h of the gas inlet valve, the stroke height h of the gas inlet valve of a cylinder having assigned to it an average pressure p within the cylinder.

In an embodiment, the present invention provides an internal combustion engine comprising a mechanically controllable valve train assembly as described above, wherein the radius $r_1$ of the first control contour has been selected in dependence on the radius $r_2$ of the second control contour so that, in the part-load range of the internal combustion engine, the pressure development $P_{ges}$ across all cylinders of the internal combustion engine is monotonously increasing over the adjustment angle of the control shaft. It is here advantageous if, in the part-load range, half of the cylinders are in the switched-off state.

In an embodiment, the present invention provides a method for operating an internal combustion engine as described above, wherein, in the idle range, at least all gas inlet valves of all cylinders are operated with an identical, increasing stroke height, wherein, in the transition range between the idle range and the part-load range, the gas inlet valves of one half of the cylinders are operated with increasing stroke height, and the gas inlet valves of the other half of the cylinders are operated with decreasing stroke height, wherein, in the part-load range, the gas inlet valves of one half of the cylinders are operated with increasing stroke height, and the gas inlet valves of the other half of the cylinders are operated with zero-stroke, wherein, in the transition range between the part-load range and the full-load range, the gas inlet valves of one half of the cylinders are operated with decreasing stroke height, and the gas inlet valves of the other half of the cylinders are operated with increasing stroke height, and wherein, in the full-load range, all gas inlet valves of all cylinders are operated with an identical, increasing stroke height.

The present invention will be explained in greater detail below with reference to the drawings.

FIG. 1 is a schematic partial view of a mechanically controllable valve train assembly 2, wherein, in the present case, two cylinders 4, 6 are illustrated which comprise gas inlet and gas outlet valves, while, for ease of survey, only one respective gas inlet valve 8, 10 is shown in FIG. 1.

There is further illustrated a camshaft 12 comprising cams 14, 16 which in the illustrated exemplary embodiment are operatively connected to a respective transmission arrangement 18, 20 for initiating a valve stroke of the gas inlet valves 8, 10. For ease of survey, certain component parts of the valve train assembly, such as e.g., bearing supports, sliding guide 74, springs, have deliberately not been depicted. These are explicitly described, for example, in DE 10 2004 003 327 which is herewith included by reference into the disclosure of the present application. For improved clarity, the cams 14, 16 as shown in FIGS. 3 to 7 are herein depicted as oriented in an identical manner, which may be different in practice.

In the present exemplary embodiment, the transmission arrangements 18, 20 comprise respective intermediate lever arrangements 22, 24 and a swivel lever arrangements 26, 28. The intermediate lever arrangements 22, 24 comprise intermediate levers 30, 32 having first rolls 34, 36, each of the latter being operatively connected to the cams 14, 16 of camshaft 12. Schematically indicated herein is a connection shaft 31 interconnecting two intermediate levers 32 assigned to the corresponding gas inlet valves 10 of cylinder 6. On connection shaft 31, a roll 33 is provided for guidance in a sliding guide 74. On the end opposite to the first rolls 34, 36, each intermediate lever 30, 32 comprises a working curve 38, 40 which in turn is in operative connection with a respective roll 42, 44 of the swivel lever arrangements 26, 28. In this configuration, the rolls 42, 44 are supported in a respective swivel lever 46, 48. The swivel levers 46, 48 themselves are on one side supported in support sites 50, 52 and on the other side 54, 56 are operative to act in a known manner on the gas inlet valves 8, 10. To set different valve stroke positions of the gas inlet valves 8, 10, a valve stroke adjustment device is provided of which only the control shaft 58 is shown. For this purpose, the control shaft 58 is in operative connection, via control contours 60, 62, to the second rolls 64, 66 of the intermediate levers 30, 32. FIG. 1 schematically represents that the control contour 60, has within a certain section, a design differing from the design of control contour 62.

As shown in greater detail in the further Figures and as explained herein, rotation of control shaft 58 will lead to different maximal strokes of the gas inlet valves 8, 10. Since the control contours 60, 62 are arranged within a basic circle of control shaft 58, the support of control shaft 58 can be realized in a particularly simple manner. In this connection, explicit reference is made to DE 10 2004 003 327 A1, while it is to be noted that a control shaft can be of a one- or a multi-part design. Control shaft 58 can also be provided with end abutments so as to facilitate the calibration of the adjustment device (not shown).

Figure 2A:
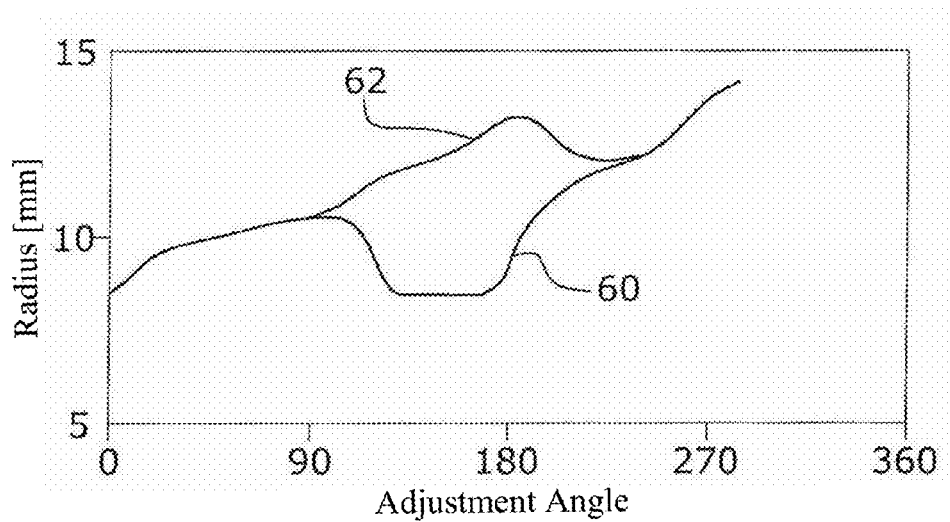
FIG. 2A shows a diagram illustrating the dependency of the radius of the first and the second control contour from the adjustment angle.
Figure 2B:
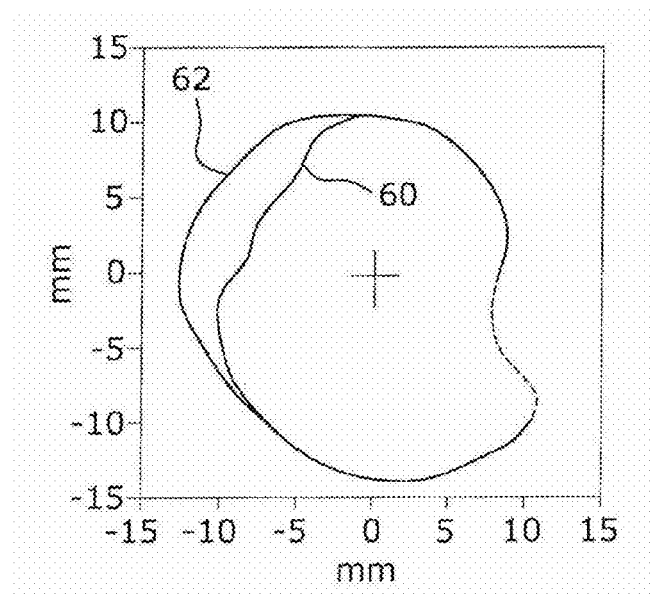
FIG. 2B shows the first and second control contours of the control shaft as derived from FIG. 2A.

In the present exemplary embodiment, it is assumed that a direct relationship exists between the radius r of the respective control contour 60, 62 and the stroke height h of the respective gas inlet valve 8, 10. To the stroke height h of the respective gas inlet valve 8, 10, there must again be assigned an average pressure p in the respective cylinder 4, 6. The cylinder 4, which has assigned to it inlet valves 8 whose control contour 60 comprises a section 68 set back relative to control contour 62 (see FIGS. 4 to 7), is herein to be designed as a shut-off cylinder. In order to prevent the occurrence of undesired load jumps in the transition ranges for switch-off or activation of the shut-off cylinder, it is a precondition that the average pressure $P_{ges}$ of the internal combustion engine, i.e., of all cylinders, is substantially monotonously increasing across the positive adjustment angle of control shaft 58, and respectively, over an increasing load. From these preconditions, there can then first be derived the diagram of FIG. 2A wherein the radius r of the respective control contour 60, 62 is plotted over the adjustment angle of the control angles 58. The control contours 60, 62 can therefrom be directly derived in accordance with FIG. 2B. In serial production, the design of control shaft 58 may of course differ from this mathematical derivation.

FIGS. 3 to 7 shows schematic representations of the valve train assembly 2 with the stroke heights of the respective gas inlet valves 8, 10 and the positions in the appertaining diagrams, wherein the upper diagram shows the respective stroke height of the respective valve 8, 10 over the adjustment angle of control shaft 58 and the lower diagram shows the average pressure in the respective cylinder 4, 6 and the development of the average total pressure $P_{ges}$ over the adjustment angle of control shaft 58.

Figure 3:
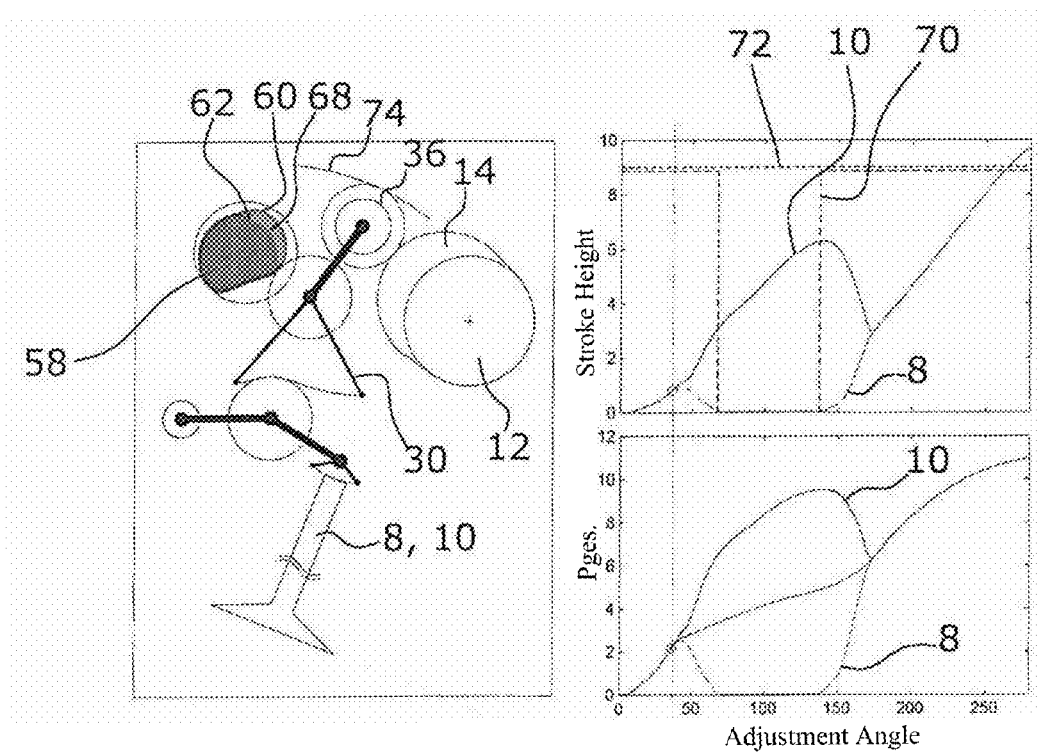
FIG. 3 shows a schematic view of the valve train assembly and the appertaining diagrams in the idle range.
Figure 4:
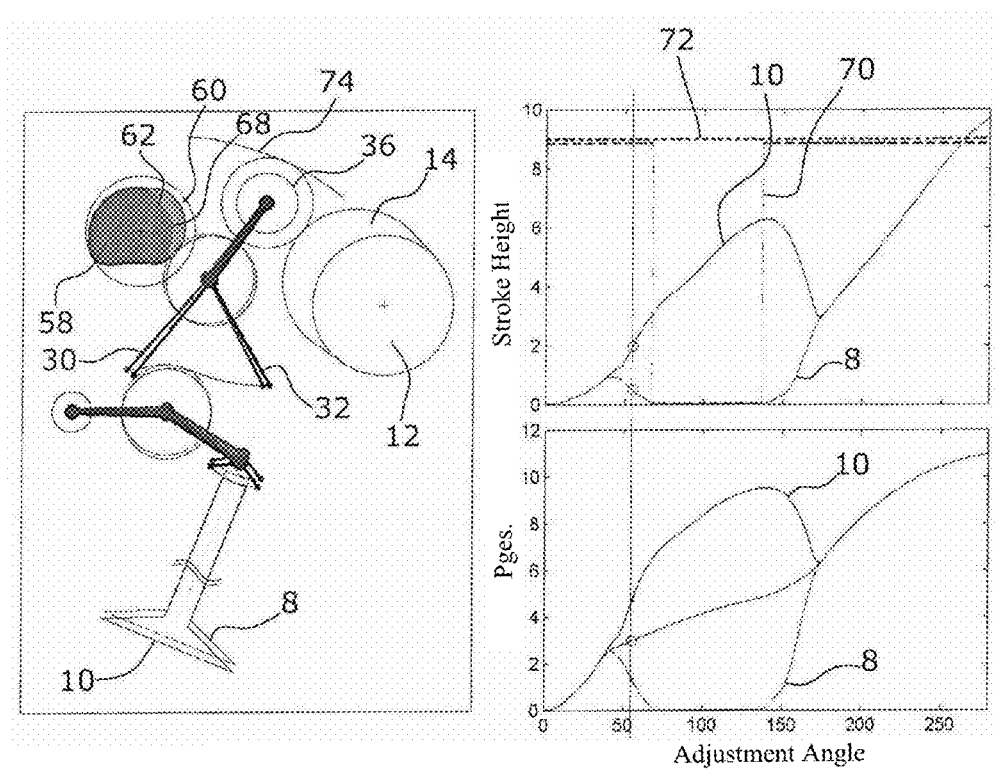
FIG. 4 shows a schematic view of the valve train assembly and the diagrams in the transition from the idle range to the part-load range.

FIG. 3 shows, as the starting position, the situation of the internal combustion engine in the idle range. The required total pressure $P_{ges}$ is very small, here ranging around 2 bar. This corresponds to a stroke height of all gas inlet valves, inclusive of the shut-off cylinder, of about 0.75 mm. The outlet valves, here marked by the lines 70, 72, will both still open in accordance with the work cycle. One can clearly see the position of control shaft 58, wherein the radius of the point of attack of the first control contour 60, $r_1$, is equal to the second control contour 62, $r_2$. With increasing load requirement, i.e., in the transition range between the idle range and the part-load range, the average stroke pressure of the first cylinder 4 will be lowered and that of the second cylinder 6 will be increased. This is represented in FIG. 4. Both outlet valves will still open in accordance with the work cycle. It is also to be clearly seen that the control contour 60 is now engaging the intermediate lever arrangement 22 by means of a section 68 which is set back relative to control contour 62.

Figure 5:
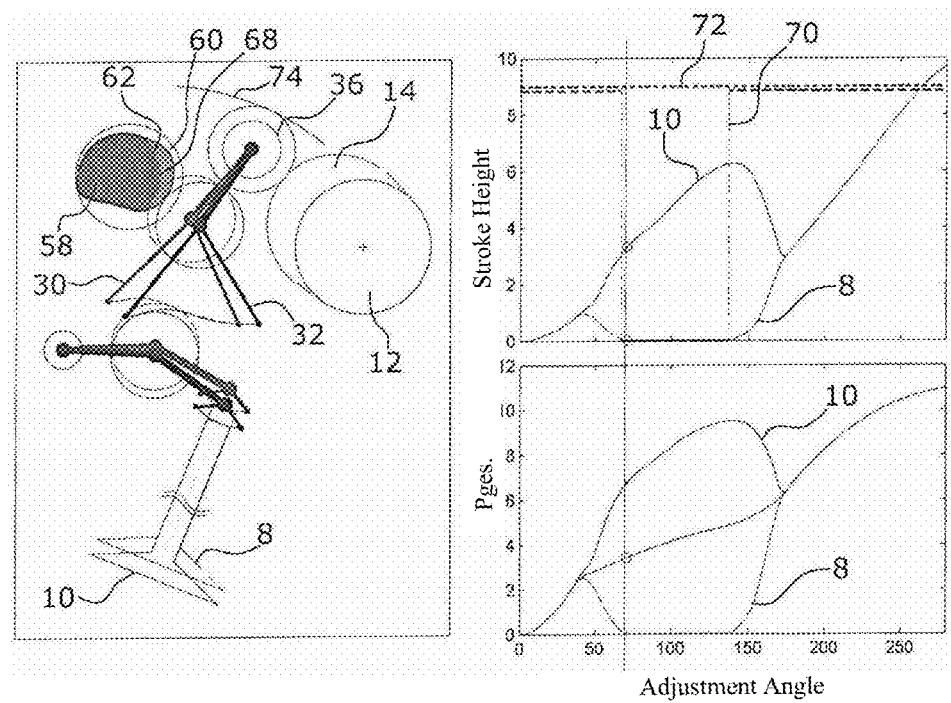
FIG. 5 shows a schematic view of the valve train assembly and the appertaining diagrams in the part-load range.

FIG. 5 now illustrates how, with further increasing load requirement, the inlet valves 8 of first cylinder 4 will remain closed. Also the appertaining outlet valves will remain closed as indicated by the line 70. During high, efficiency-enhancing loads, the second group of cylinders 6 will be operated in a manner realizing a pressure development $P_{ges}$ which is rising substantially linearly across all cylinders 4, 6.

Figure 6:
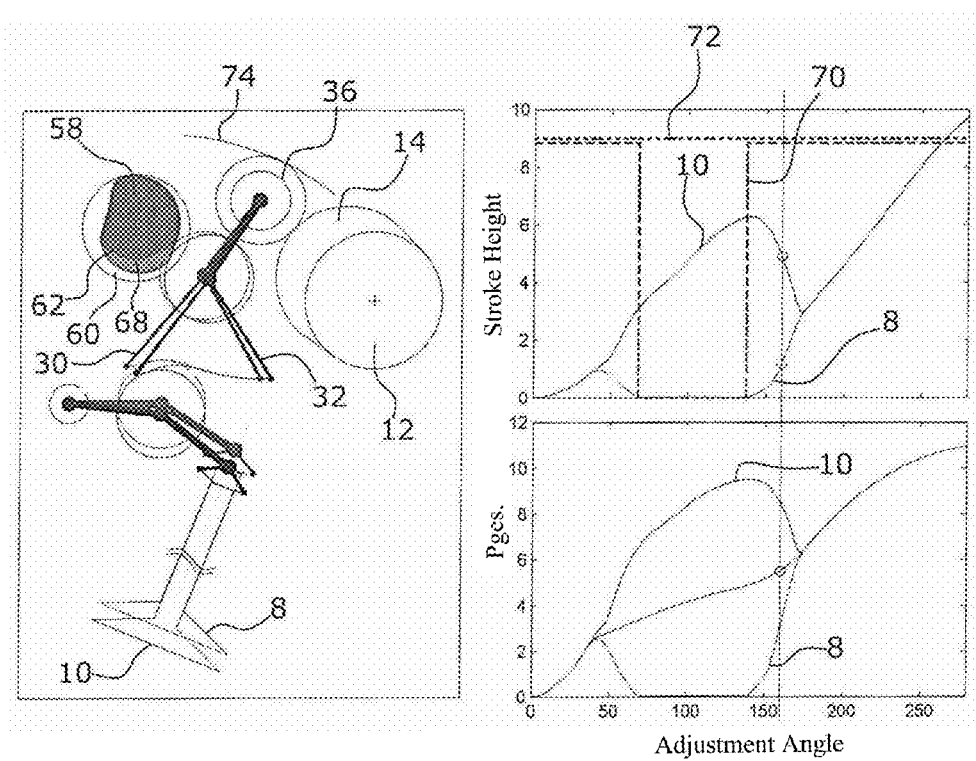
FIG. 6 shows a schematic view of the valve train assembly and the appertaining diagrams in the transition from the part-load range to the full-load range.

FIG. 6 illustrates the situation in the transition range between the part-load range and the full-load range. Here, a further load requirement can still be reflected only by reactivation of the first group of cylinders 8. For reflecting a continued monotonous development of the moment of the engine, the load of the second cylinders 10 will be correspondingly reduced.

Figure 7:
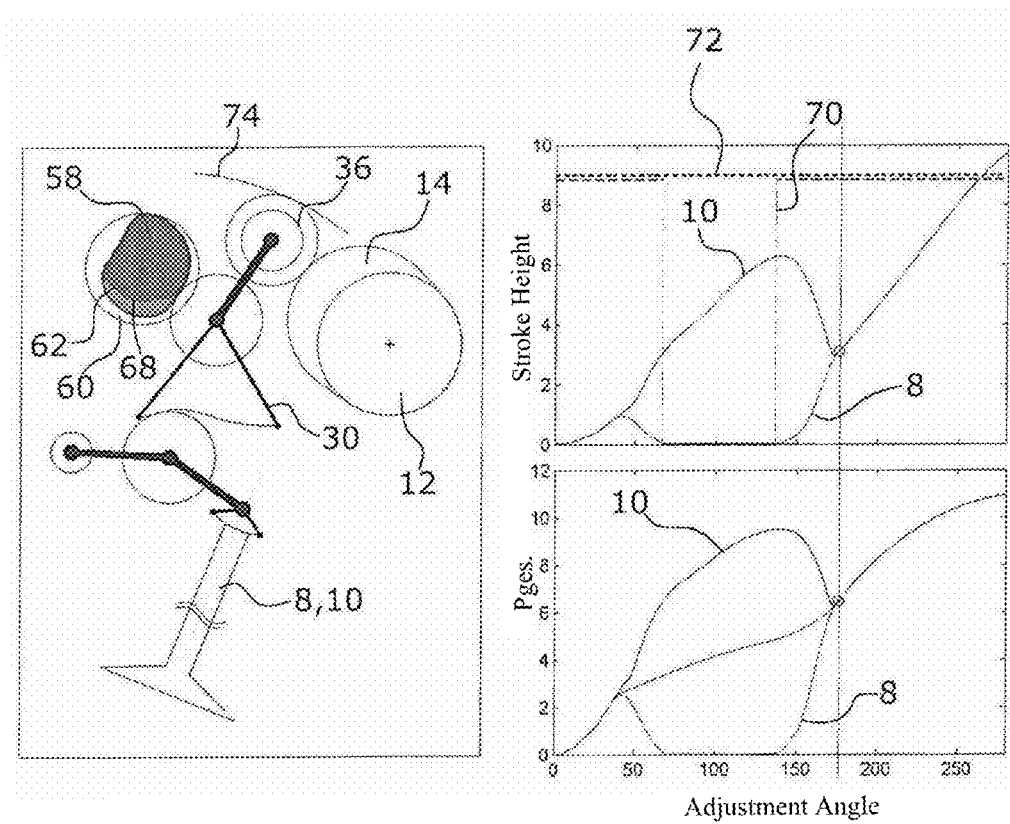
FIG. 7 shows a schematic view of the valve train assembly and the appertaining diagrams in the full-load range.

FIG. 7 illustrates the situation in the full-load range. Both control contours 60, 62 will now engage the respective engagement member 64, 66 of intermediate lever 30, 32 with the same radius again.

The present invention is not limited to embodiments described herein; reference should be had to the appended claims.

What is claimed is:

1. A mechanically controllable valve train assembly for an internal combustion engine comprising cylinders, at least one of which is a shut-off cylinder and at least one of which is a remaining cylinder, each of the cylinders comprising at least one gas inlet valve and at least one gas outlet valve, the mechanically controllable valve train assembly comprising:
    at least one swivel lever arrangement, each of the at least one swivel lever arrangement comprising a swivel lever;
    a camshaft comprising a peripheral contour;
    a valve stoke adjusting device comprising a control shaft comprising control contours arranged thereon;
    at least one intermediate lever arrangement, each of the at least one intermediate lever arrangement comprising,
        an intermediate lever comprising a working curve configured to cooperate with the swivel lever, and
        an engagement element configured to be operatively connected to one of the control contours of the valve stoke adjusting device so that different valve strokes are adjustable and a zero stroke adjustment of the at least one gas inlet valve of the at least one shut-off cylinder exists,
        each intermediate lever being configured to be operatively connected to the peripheral contour of the camshaft;
    at least one transmission arrangement, each of the at least one transmission arrangement being arranged so that one of the at least one intermediate lever arrangement and one of the at least one swivel lever arrangement is associated with each of the at least one gas inlet valve,
    wherein, with respect to the control contours,
    a control contour for an idle range is substantially identical in design to a control contour for a full-load range, and
    a control contour for a part-load range of the at least one gas inlet valve assigned to the shut-off cylinder comprises a section having a different design compared to a control contour for a part-load range of the at least one gas inlet valve of the remaining cylinder.

2. The mechanically controllable valve train assembly as recited in claim 1, wherein the control shaft further comprises an outer radius provided as a basic circle, wherein the control contours are arranged within the basic circle.

3. The mechanically controllable valve train assembly as recited in claim 1, wherein the control shaft further comprises end abutments.

4. The mechanically controllable valve train assembly as recited in claim 1, wherein the section of the control contour assigned to the shut-off cylinder is set back relative to a corresponding section of the control contour assigned to the remaining cylinder.

5. The mechanically controllable valve train assembly as recited in claim 1, wherein each intermediate lever further comprises a first roll configured to provide for a force transmission of the camshaft, and further comprising a connection shaft comprising at least one second roll, the connection shaft being configured to connect two of the intermediate levers to each other at an end opposite to the working curve, wherein the at least one second roll is configured to be guided in a sliding guide.

6. The mechanically controllable valve train assembly as recited in claim 1, wherein each of the control contours comprises a radius, and the at least one gas inlet valve comprises a stroke height, wherein a direct ratio exists between the radius of a control contour and the stroke height of the at least one gas inlet valve, and the stroke height of the gas inlet valves of a cylinder has an average pressure within the cylinder assigned thereto.

7. An internal combustion engine comprising the mechanically controllable valve train assembly as recited in claim 1, wherein the control contours include a first control contour comprising a first radius and a second control contour comprising a second radius, wherein the first radius of the first control contour is selected dependent on the second radius of the second control contour so that, in the part-load range of the internal combustion engine, a pressure development across each of the cylinders monotonously increases over an adjustment angle of the control shaft.

8. The internal combustion engine as recited in claim 7, wherein, in the part-load range, half of the cylinders are in a switched-off state.

9. A method for operating the internal combustion engine as recited in claim 7, the method comprising:
- in a direction of an increasing moment of rotation, in an idle range, operating each of the at least one gas inlet valve with an identical, increasing stroke height;
- in a transition range between the idle range and the part-load range, operating the at least one gas inlet valve of half of the cylinders with an increasing stroke height, and the at least one gas inlet valve of the other half of the cylinders with a decreasing stroke height;
- in the part-load range, operating the at least one gas inlet valves of one half of the cylinders with an increasing stroke height, and the at least one gas inlet valve of the other half of the cylinders with a zero-stroke;
- in the transition range between the part-load range and the full-load range, operating the at least one gas inlet valve of one half of the cylinders with a decreasing stroke height and the at least one gas inlet valve of the other half of the cylinders with an increasing stroke height; and
- in the full-load range, operating each of the at least one gas inlet valve of the cylinders with an identical, increasing stroke height.

\* \* \* \* \*